United States Patent [19]

Ahle

[11] 3,719,466

[45] March 6, 1973

[54] PROTECTION OF WHEAT AND GRAIN SORGHUM FROM HERBICIDAL INJURY

[75] Inventor: James Ahle, Shawnee, Kans.

[73] Assignee: Gulf Research & Development Company, Pittsburgh, Pa.

[22] Filed: April 16, 1970

[21] Appl. No.: 29,265

[52] U.S. Cl. ..........................71/88, 47/57.6, 71/92, 71/106, 71/112, 71/114, 71/118
[51] Int. Cl. ..........................A01n 9/20, A01n 9/22
[58] Field of Search....71/88, 106, 92, 112, 114, 118; 47/57.6

[56] References Cited

UNITED STATES PATENTS

| | | | |
|---|---|---|---|
| 3,117,909 | 1/1964 | Douros, Jr. et al. | 424/27 |
| 3,442,945 | 5/1969 | Olin | 260/562 |
| 3,564,768 | 2/1971 | Hoffman | 47/57.6 |

Primary Examiner—Lewis Gotts
Assistant Examiner—Catherine L. Mills
Attorney—Richard L. Kelly, Carl A. Cline, Forrest D. Stine and Howard F. Van Denburgh

[57] ABSTRACT

Grain is protected from injury by 2-chloro-2',6'-diethyl-N-(methoxymethyl)acetanilide (alachlor) by coating the seeds prior to planting with a non-phytotoxic quantity of one of a small group of specific compounds. For example, grain sorghum seed may be protected by coating with a compound selected from the following group:

ethyl 2-perimidinecarboxylate
N,N-diallylpropionamide,
N,N-diallylacetamide,
1,8-didecyl naphthalate,
1,8-disodium naphthalate, and
1,8-naphthalic anhydride and wheat is protected by coating the seed with one or more of the following compounds:

ethyl N,N-di-2-propynyloxamate, and
ethyl N,N-diallyloxamate.

5 Claims, No Drawings

PROTECTION OF WHEAT AND GRAIN SORGHUM FROM HERBICIDAL INJURY

DESCRIPTION OF THE INVENTION

In U. S. Pat. No. 3,131,509 there is disclosed the coating of crop seeds with a non-phytotoxic quantity of an antagonistic agent for a selective herbicide, thereby protecting the crop from injury when the specific herbicide is employed to control weeds. The aforementioned patent specifically exemplifies the treatment of wheat seed with compounds which are antagonists to barban and to certain thiolcarbamate herbicides.

By private communication with the patentee of the aforementioned patent the present inventor has learned of the recent discovery of a method of protecting corn (Zea Mays) seeds from S-alkyl N,N-dialkylthiolcarbamate herbicides by coating the seed with a protective amount of a chemical compound such as naphthalic anhydride. I have now discovered that small grains such as wheat and grain sorghum can be protected from a commercial herbicide of a different chemical type by using one or more of a small number of specific chemical compounds as seed coating agents. A relatively small amount of chemical is sufficient to protect the seed and the method of coating is uncomplicated. Ordinarily, thorough agitation of seed with from 1 to 5 percent by weight of the protecting chemical so as to obtain a reasonably even distribution of the chemical over the surfaces of the seeds will give the desired effect. If the coating were done with extreme efficiency so as to make sure that each seed has on it exactly the same amount of chemical as every other seed it is probable that an even smaller amount of chemical would be required. However, the cost of the chemicals is not so high as to make it necessary to reduce the quantity used below about 1 percent by weight. The effect of the chemicals is quite specific and unpredictable. For example, 3 percent by weight of N,N-diallylpropionamide and N,N-diallylacetamide have given complete protection of grain sorghum seed against the herbicide 2-chloro-2',6'-diethyl-N-(methoxymethyl)acetanilide (alachlor) applied at a rate of 2 lb per acre. However, 3 percent by weight of the closely related compound N,N-diallyl-2-phenoxypropionamide prevented all of the seeds from germinating. There are other instances in which compounds of apparently similar structural formulas either fail to act as protecting agents or kill the seeds. The method of protecting seeds may be demonstrated in the greenhouse as illustrated in the following examples.

EXAMPLE I

Grain sorghum seed was treated by mixing the seed thoroughly with 3 percent by weight of the chemical in a small amount (about 2 percent by weight) of methanol so as to obtain an even distribution of the protecting chemical over the surfaces of the seeds. Greenhouse soil was placed in 12 in. × 10 in. × 3 in. disposable plastic trays, sometimes called "flats". The seeds were planted in the soil, covered, and the selective herbicide was applied by spraying at the rate of 2 lb per acre. The planted, treated flats were kept in the greenhouse at the proper temperature and humidity for germination and growth, along with flats seeded with untreated seeds, for a period of one month, after which they were examined and results were compared. It was found that untreated seeds were killed by the herbicide, whereas complete protection against the herbicide was obtained in each instance by treating the seeds with 3 percent by weight of one of the following chemicals:

ethyl 2-perimidinecarboxylate
N,N-diallylpropionamide
N,N-diallylacetamide,
1,8-didecyl naphthalate,
1,8-disodium naphthalate, and
1,8-naphthalic anhydride

EXAMPLE II

Wheat seed was treated with ethyl N,N-di-2-propynyloxamate and with ethyl N,N-diallyloxamate at two different concentrations, 2 percent by weight and 4 percent by weight. The effect of treating with each of the protective chemicals at each rate, as well as the effect of leaving the seed untreated was tested according to the procedure in Example I in two sets of experiments in which the selective herbicide was applied at the rate of 1 lb per acre and at 2 lb per acre. At the end of 1 month in the greenhouse the results were evaluated. It was found that when either of the chemicals was applied to the seed at the rate of 4 percent by weight, complete protection against the selective herbicide alachlor was obtained at both 1 lb per acre and 2 lb per acre. When the amount of chemical used to treat the seed was reduced to 2 percent by weight, the seeds were protected completely against the selective herbicide only at the 1 lb per acre rate, the protection against the herbicide at 2 lb per acre being incomplete but substantial (50 percent or more).

It can be seen from the illustrative examples that the use of more seed protective agent does to some extent offer greater protection against higher rates of application of the selective herbicide. However, it will be understood that the rate of application of the herbicide should be kept within reasonable limits since at very high rates of application the herbicide becomes less selective and there is probably no feasible means of obtaining complete protection.

In general, only a very limited class of herbicides may be employed to combat weeds in small grains and usually these herbicides are rather specialized in their selective action. For example, the herbicide barban is used only for the purpose of killing wild oats in wheat. There is a need for a larger number of herbicides with a greater variety of selective phytotoxicity for use in growing small grains. The method of this invention extends the usefulness of the commercial herbicide alachlor to the killing of weeds in crops in which it has not been feasible to employ this herbicide in the past. The small group of chemical protective agents disclosed herein are apparently quite specific in their action. Optimum rates of application of both the herbicide and protective agents may be readily determined by workers of ordinary skill in the art, using customary procedures.

I claim:

1. The method of rendering wheat and grain sorghum seed resistant to the selective herbicide 2-chloro-2',6'-diethyl-N-(methoxymethyl) acetanilide, in which said wheat seed is protected by applying to the seed prior to planting an effective but substantially non-phytotoxic quantity of a compound selected from the group consisting of ethyl N,N-di-2-propynyloxamate and ethyl N,N-diallyloxamate and said grain sorghum seed is protected by applying to the seed prior to planting an effective but substantially nonphytotoxic quantity of a compound selected from the group consisting of ethyl 2-perimidinecarboxylate, N,N-diallylpropionamide, N,N-diallyacetamide, 1,8-didecyl naphthalate, 1,8-disodium naphthalate and 1,8-naphthalic anhydride.

2. The method of rendering wheat seed resistant to the selective herbicide 2-chloro-2',6'-diethyl-N-(methoxymethyl)acetanilide comprising applying to the seeds prior to planting an effective but substantially non-phytotoxic quantity of a compound selected from the group consisting of:
ethyl N,N-di-2-propynyloxamate, and
ethyl N,N-diallyloxamate.

3. A method of rendering grain sorghum seed resistant to the selective herbicide 2-chloro-2',6'-diethyl-N-(methoxymethyl)acetanilide comprising applying to the grain sorghum seeds prior to planting an effective but substantially non-phytotoxic quantity of a compound selected from the group consisting of:
ethyl 2-perimidinecarboxylate,
N,N-diallylpropionamide,
N,N-diallylacetamide,
1,8-didecyl naphthalate,
1,8-disodium naphthalate,
1,8-naphthalic anhydride.

4. Wheat seed bearing thereon a coating of a substantially non-phytotoxic amount of a compound selected from the group consisting of:
ethyl N,N-di-2-propynyloxamate and
ethyl N,N-diallyloxamate, sufficient to improve the resistance of wheat seed to the selective herbicide 2-chloro-2',6'-diethyl-N-(methoxymethyl)acetanilide.

5. Grain sorghum seed bearing thereon a coating of a substantially non-phytotoxic amount of a compound selected from the group consisting of:
ethyl 2-perimidinecarboxylate,
N,N-diallylpropionamide,
N,N-diallylacetamide,
1,8-didecyl naphthalate,
1,8-disodium naphthalate, and
1,8-naphthalic anhydride,
sufficient to improve the resistance of a grain sorghum seed to the selective herbicide 2-chloro-2',6'-diethyl-N-(methoxymethyl)acentanilide.

* * * * *